(12) United States Patent
Weddington et al.

(10) Patent No.: US 9,971,724 B1
(45) Date of Patent: May 15, 2018

(54) OPTIMAL MULTI-CORE NETWORK ARCHITECTURE

(71) Applicants: Isaac B. Weddington, Hiawatha, IA (US); David J. Radack, Robins, IA (US); J. Perry Smith, Shellsburg, IA (US); Branden H. Sletteland, Marion, IA (US); Greg L. Shelton, Cedar Rapids, IA (US)

(72) Inventors: Isaac B. Weddington, Hiawatha, IA (US); David J. Radack, Robins, IA (US); J. Perry Smith, Shellsburg, IA (US); Branden H. Sletteland, Marion, IA (US); Greg L. Shelton, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 222 days.

(21) Appl. No.: 14/743,739

(22) Filed: Jun. 18, 2015

(51) Int. Cl.
| | |
|---|---|
| *G06F 13/36* | (2006.01) |
| *G06F 15/16* | (2006.01) |
| *G06F 17/00* | (2006.01) |
| *G06F 9/00* | (2006.01) |
| *H04L 29/06* | (2006.01) |
| *G06F 15/173* | (2006.01) |
| *G06F 13/40* | (2006.01) |
| *G06F 13/42* | (2006.01) |

(52) U.S. Cl.
CPC ...... *G06F 13/4027* (2013.01); *G06F 13/4221* (2013.01)

(58) Field of Classification Search
CPC . H04L 47/2441; H04L 47/60; H04L 47/6215; H04L 47/10; H04L 47/2433
USPC ............... 710/308; 370/235, 352, 466, 230; 709/230, 217, 223, 225, 229
See application file for complete search history.

(56) References Cited

U.S. PATENT DOCUMENTS

| | | | | |
|---|---|---|---|---|
| 5,896,499 | A * | 4/1999 | McKelvey | G06F 21/74 726/11 |
| 6,987,961 | B1 * | 1/2006 | Pothana | G06F 15/167 455/412.1 |
| 7,047,292 | B1 * | 5/2006 | Stewart | H04L 41/0213 709/224 |

(Continued)

*Primary Examiner* — Faisal M Zaman
(74) *Attorney, Agent, or Firm* — Angel N. Gerdzhikov; Donna P. Suchy; Daniel N. Barbieri

(57) ABSTRACT

A multicore processor system and a method of operating the system defines a processor partition (which may include one or more processor cores) as a network offload engine for a network connected to the processor system. Network operations requests from other cores or partitions of the processor system are forwarded to the network offload engine by a cross-platform inter-partition communications component including a relay task in the network offload engine for receiving network operations requests from network proxies in the other partitions. The network offload engine then controls access to network resources by the other cores or partitions and applications running thereon. A second or additional core or partition of the processor system may be similarly defined as a network offload engine for a second or additional network, receiving network operations requests from the other partitions through a similar system of relay task and network proxies.

20 Claims, 4 Drawing Sheets

(56) References Cited

U.S. PATENT DOCUMENTS

| | | | | |
|---|---|---|---|---|
| 7,340,637 B2* | 3/2008 | Nagoya | G06F 11/2025 | 709/214 |
| 7,616,563 B1* | 11/2009 | Eiriksson | H04L 45/00 | 370/230 |
| 8,180,973 B1* | 5/2012 | Armangau | G06F 9/5033 | 709/225 |
| 8,464,333 B1* | 6/2013 | Chen | H04L 29/12433 | 380/264 |
| 8,589,503 B2* | 11/2013 | Alperovitch | H04L 45/02 | 709/207 |
| 8,848,741 B2* | 9/2014 | Cook | H04L 29/06136 | 370/474 |
| 8,855,143 B1* | 10/2014 | Acampora | H04L 69/321 | 370/477 |
| 9,485,218 B2* | 11/2016 | Harp | H04L 63/0227 | |
| 9,705,848 B2* | 7/2017 | Cullimore | H04L 63/0209 | |
| 2005/0165985 A1* | 7/2005 | Vangal | G06F 13/4027 | 710/107 |
| 2005/0232155 A1* | 10/2005 | Morikawa | H04L 47/2416 | 370/235 |
| 2006/0037072 A1* | 2/2006 | Rao | H04L 1/1854 | 726/14 |
| 2006/0126628 A1* | 6/2006 | Li | H04L 29/06 | 370/392 |
| 2006/0155907 A1* | 7/2006 | Yoshida | G06F 13/24 | 710/260 |
| 2008/0153421 A1* | 6/2008 | Rothman | G06F 13/385 | 455/63.3 |
| 2008/0228971 A1* | 9/2008 | Rothman | G06F 9/45558 | 710/104 |
| 2010/0014422 A1* | 1/2010 | Lee | H04L 47/14 | 370/230 |
| 2010/0157887 A1* | 6/2010 | Kopplin | H04L 47/10 | 370/328 |
| 2011/0010469 A1* | 1/2011 | Kinsey | G06F 9/45558 | 709/250 |
| 2012/0222114 A1* | 8/2012 | Shanbhogue | G06F 21/53 | 726/22 |
| 2012/0324222 A1* | 12/2012 | Massey | H04L 63/105 | 713/166 |
| 2013/0021904 A1* | 1/2013 | Dolan | H04W 76/027 | 370/230 |
| 2013/0204965 A1* | 8/2013 | Masputra | H04L 47/60 | 709/217 |
| 2015/0009988 A1* | 1/2015 | Lim | H04L 47/2458 | 370/389 |
| 2015/0019702 A1* | 1/2015 | Kancherla | H04L 47/125 | 709/223 |

* cited by examiner

OPTIMAL MULTI-CORE NETWORK ARCHITECTURE

BACKGROUND

Avionics processing systems must run multiple applications in real time in a safety-critical environment (e.g., a partitioned ARINC 653 compatible environment). The size, weight, and power requirements of these avionics systems, as well as their cost, could be significantly reduced by the implementation of multi-core processors. However, sharing network resources in a multi-core (ex.—multi-partitioned) environment presents determinism issues with non-optimal solutions. For example, multiple applications or partitions, each having a different criticality level, may wish to access an external network connection. As the network connection is of limited bandwidth, not every application can access network resources either at once or at will. Furthermore, predetermined data needs may require that some applications or messages require latency guarantees between their origin and destination, or that their access to network resources is restricted to a predetermined level.

Restricting network access to a single core or partition would require expensive applications to be created either to directly access, or not access, the network. Providing a complete network solution for each individual core or partition would require a unique network (e.g., Ethernet) interface for each core or partition as well as certification of each network component on a different operating system, neither of which would be cost-effective. Similarly, implementing a network stack in each core or partition with a shared Ethernet driver would require separate certification of network components on different operating systems and a complex, multi-core-aware, Ethernet driver. Finally, while avoiding multi-core avionics solutions entirely would bypass these deterministic problems, this option would also preclude the size, weight, power, and cost advantages of multicore avionics processing. It may therefore be desirable to implement a multi-core processor architecture capable of interfacing with one or more networks while minimizing complexity and determinism issues.

SUMMARY

In one aspect, embodiments of the inventive concepts disclosed herein are directed to a network architecture including a multicore processor system. In one embodiment, the multicore processor system includes a shared system memory. In one embodiment, the multicore processor system includes a first partition (ex.—core, thread, execution unit) coupled to a network associated with a network protocol. The first partition may serve as a network offload engine with respect to the network and include a first operating system (ex.—network operating system, guest operating system (GOS)). The first partition may include one or more applications configured to execute on the first partition. The first partition may include a network stack (ex.—software stack, protocol stack) associated with the network. The first partition may include a flow control component configured to control access to the network for at least one application. The first partition may include a device driver (ex.—network driver) coupled to the network by a communications device (ex.—controller, network controller). In one embodiment, the multicore processor system includes at least one second partition. The second partition may include a second operating system and one or more applications configured to execute on the second partition.

In one embodiment, the multicore processor system includes a cross-platform inter-partition communication (CIPC) component coupled to the first partition by a relay task, coupled to each second partition by a network proxy, and coupled to the shared system memory by a shared memory unit. The network proxy may be configured to forward network operations requests associated with the network (from applications on the at least one second partition) to the network offload engine. The relay task may then receive the network operations requests for fulfillment by the network offload engine. The flow control component may then grant or deny the network operations requests.

In a further aspect, the inventive concepts disclosed herein are directed to a method for operating a multicore processor system. In one embodiment, the method involves defining a first partition of the processor system as a network offload engine configured to control access of the processor system to a network coupled to the first partition. In one embodiment, the method involves generating a network operations request via a first application configured to execute on a second partition of the processor system. In one embodiment, the method involves forwarding the network operations request to the network offload engine via a network proxy of the second partition. In one embodiment, the method involves receiving the network operations request via a relay task of the first partition. In one embodiment, the method involves fulfilling the network operations request via the network offload engine.

BRIEF DESCRIPTION OF THE DRAWINGS

The inventive concepts disclosed herein may be better understood by those skilled in the art by reference to the accompanying figures in which.

DETAILED DESCRIPTION

Features of the inventive concepts disclosed herein in their various embodiments are exemplified by the following descriptions with reference to the accompanying drawings, which describe the inventive concepts with further detail. It is to be understood that both the foregoing general description and the following detailed description are exemplary and explanatory only and are not necessarily restrictive of the inventive concepts disclosed and claimed herein. These drawings depict only exemplary embodiments of the inventive concepts, and should not be considered to limit their scope in any way.

Figure 1:
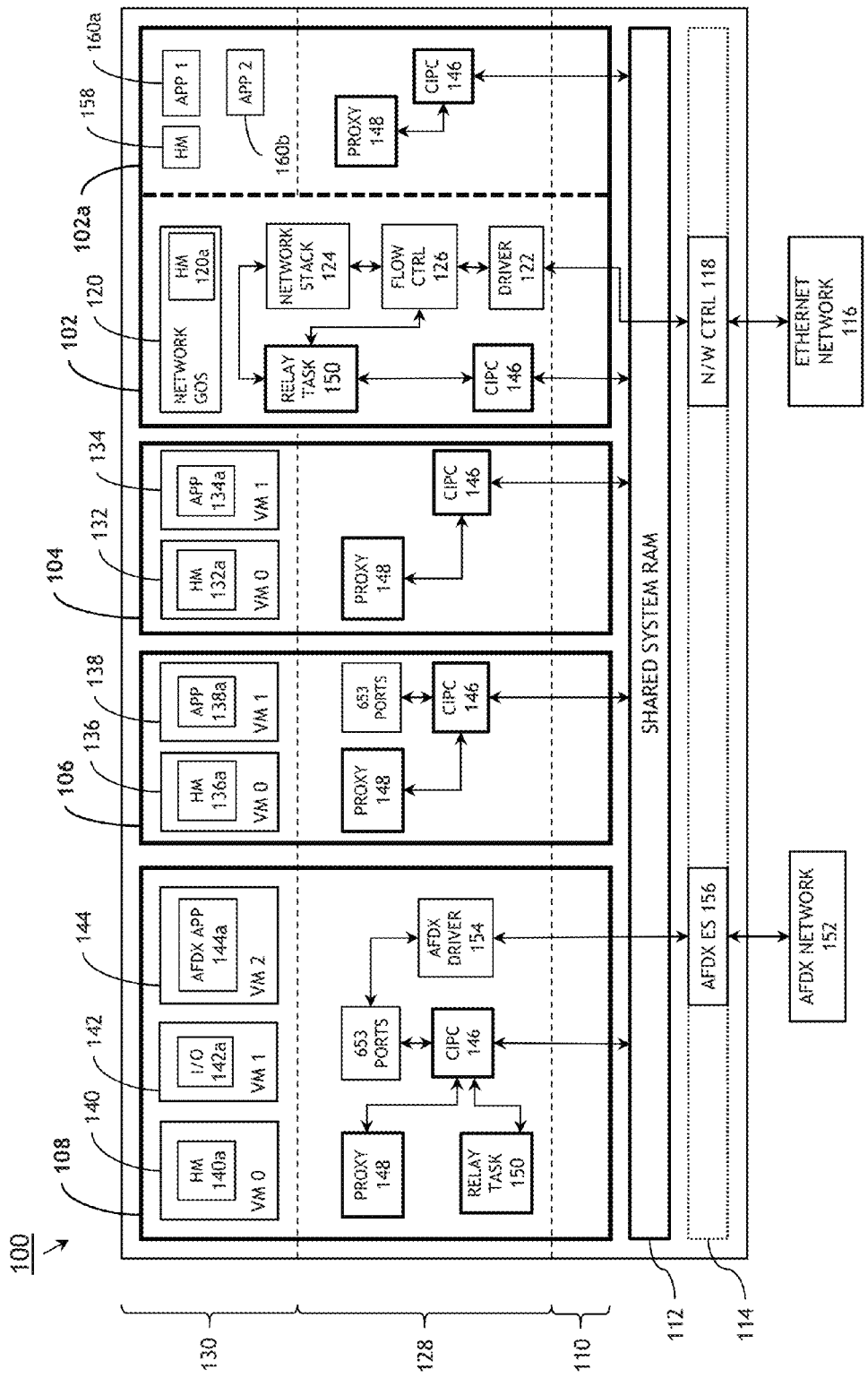
FIG. 1 is a block diagram depicting a processor system according to embodiments of the inventive concepts disclosed herein.

FIG. 1 illustrates a partitioned processor system 100 for an avionics control system according to the inventive concepts disclosed herein. The partitioned processor system 100 may be an ARINC 653 compliant processor system embodied in an aircraft control system, the partitioned processor system 100 comprising a network offload engine (ex.—network core) 102 and application cores 104, 106, and 108. In one embodiment, the partitioned processor system 100 comprises a multi-core processor or group of processors, of which the network offload engine 102 and the application cores 104, 106, and 108 each comprise one or more cores. In one embodiment, the partitioned processor system 100 comprises a multi-threaded or hyper-threaded core, of which the network offload engine 102 and the application cores 104, 106, and 108 each comprise one or more threads or execution units. The partitioned processor system 100 may include a hypervisor (ex.—virtual machine monitor) 110, responsible for generating the individual partitions of the partitioned processor system 100, as well as a shared system RAM 112 and a hardware layer 114. For example, the network core 102 may be defined as a network offload engine 102 by the hypervisor 110 of the processor system 100.

The network offload engine 102 may be connected to a network 116 via a network controller 118 or similar communications device. Accordingly, the network offload engine 102 may host a network guest operating system (GOS) 120 that allows the network offload engine 102 to serve as a single checkpoint to guarantee, monitor, and/or control access to network resources by the other cores of the partitioned processor system 100 (i.e., the application cores 104, 106, 108 and any applications executing thereon). The network GOS 120 may further include a GOS health monitor 120a. For example, the network 116 may be an Ethernet network associated with a particular network protocol (e.g., TCP/IP or UDP/IP) to which the network offload engine 102 is connected by an Ethernet controller 118 or similar device. The network 116 may include other network protocols such as Avionics Full Duplex Ethernet (AFDX) or non-Ethernet protocols such as ARINC 429 or MIL-STD-1553.

The network offload engine 102 may also include a device driver 122, a certified network stack 124 (ex.—software stack, protocol stack), and a flow control component 126 in its kernel space 128. As the network offload engine 102 isolates asynchronous network traffic from the application cores 104, 106, 108, only a single certified network stack 124 is required and the network controller 118 need not be multi-core aware (i.e., the network controller 118 communicates solely with a single core or partition, the network offload engine 102). The application cores 104, 106, and 108 may host applications of varying levels of criticality (e.g., safety-critical applications, hard and soft real-time applications, non-real-time applications) and may therefore be assigned different criticality levels by the partitioned processor system 100 based on these applications.

One or more of the application cores 104, 106, 108 may include a partitioned GOS, whereby the application layer 130 of each application core 104, 106, 108 includes one or more virtual machines. For example, the application core 104 may be partitioned (e.g., by the hypervisor 110) into a default virtual machine 132 (at VM 0), on which a partition-level (ex.—GOS) health monitor (HM) 132a runs, and a virtual machine 134 (at VM 1 . . . VM n) on which one or more applications 134a execute. Similarly, the application core 106 may include a default virtual machine 136 (at VM 0), housing the GOS health monitor 136a, and a virtual machine 138 (at VM 1 . . . VM n) on which one or more applications 138a execute. The applications 134a and 138a running on virtual machines 134 and 138 may include any appropriate combination of hard real-time, soft real-time, and non-real-time applications. The application core 108 may be partitioned into virtual machines 140, 142, and 144. For example, the default virtual machine 140 (at VM 0) may house a module-level health monitor 140a serving the entire multicore processing resource (MCPR) of the partitioned processing system 100. The virtual machine 142 (at VM 1) may host an I/O application 142a, and the virtual machine 144 at VM 2 may host an Avionics Full Duplex Ethernet (AFDX) application 144a.

The partitioned processor system 100 may include a cross-platform inter-partition communications component (CIPC) 146 for communicating or transferring network operations requests and network traffic between the application cores 104, 106, 108 and the network offload engine 102 (as well as the network GOS 120 hosted by the network offload engine 102). The network offload engine 102 may thereby act as a protocol server for the application cores 104, 106, 108 with respect to the network 116 offloaded by the network offload engine 102. For example, the CIPC 146 may include a sockets proxy or similar network proxy 148 in each application core 104, 106, 108 for forwarding network operations requests from the applications (e.g., 134a, 138a, 142a) executing on the various application cores 104, 106, 108 via the CIPC 146. The CIPC 146 may additionally allocate memory units for the network offload engine 102 and the application cores 104, 106, 108 from the shared system RAM 112. The CIPC 146 may additionally include a relay task 150 in the network offload engine 102 for receiving and responding to network operations requests. For example, if the application 138a running on the application core 106 sends a network operations request to the network offload engine 102, the CIPC 146 may check for outstanding requests or messages from other application cores 104, 108 before fulfilling the network operations request via the network offload engine 102.

The flow control component 126 of the network offload engine 102 may control access to the network 116 for the application cores 104, 106, 108 by enforcing network resource limits based on assigned criticality levels or predetermined data requirements. For example, a high-criticality application may impose latency requirements on its network messages (e.g., that network messages must arrive at their destination with a certain time window after the network operations request is sent, as opposed to waiting enqueued to transmit). The flow control component 126 may grant a network operations request associated with such a network message if no application of higher criticality or priority is currently accessing the network or likely to do so within the required time window. Similarly, the flow control component 126 may deny a network operations request (or throttle back, or truncate, a network operation in progress) from a low-criticality application in favor of a higher priority application, or if the application being denied is exceeding its predetermined data requirements.

A GOS running on an application core 104, 106, 108 may more efficiently use its own software stack (not shown) as opposed to the deterministic certified protocol stack of the network offload engine 102 (i.e., network stack 124). The output of this software stack may therefore feed through the CIPC 146 (e.g., via the relay task 150) but bypass the network stack 124, feeding directly to the flow control component 126 of the network offload engine 102. In addition, the partitioned processor system 100 may elect to prioritize hardware specific inter-core or inter-partition communication mechanisms (e.g., Freescale's Datapath Acceleration Architecture (DPAA), not shown) over the shared system memory based CIPC 146.

In one embodiment, an application core 108 of the partitioned processor system 100 may be connected to an AFDX network 152 or a similar second network. For example, the application core 108 may include an AFDX driver 154 coupled to an AFDX device 156 (ex.—AFDX end system) or a similar network controller or communications device at the hardware layer 114. In addition, the application core 108 may serve as an AFDX protocol server and/or AFDX offload engine for the application cores 104, 106 (and the network offload engine 102) with respect to the AFDX network 152. For example, the application core 108 may include a second relay task 150 for receiving AFDX network operations requests from applications running on cores 104, 108 or the network offload engine 102, forwarded by complementary AFDX network proxies (not shown) on the cores 102, 104, 108. The second network to which the partitioned processor system 100 is connected includes, but is not restricted to an AFDX network 152. As with the first network 116, the second network may utilize ARINC 653, MIL-STD-1553, or other non-Ethernet network protocols. The second network 152 may use the same protocols as the first network 116. For example, if the second network 152 is an Ethernet network using protocols similar to the first network 116, the application core 108 may include an additional flow control component 126 (not shown) for controlling processor system access to the resources of the second network 152. In one embodiment, flow control and access control for the AFDX network 152 may be handled at a lower level by the network controller (AFDX device 156) or the AFDX network driver 154 rather than by a separate flow control component 126. The partitioned processor system 100 may be connected to, and may utilize the resources of, additional networks in similar fashion, depending on the precise configuration of the partitioned processor system 100.

In one embodiment, a partitioned processor system 100 experiencing generally low network traffic further partitions a network core hosting the network offload engine 102 to more efficiently use spare processing time not otherwise occupied by network operations. For example, the network core or partition hosting network offload engine 102 may include a second application partition 102a (ex.—sub-partition). In contrast to application cores 104, 106, and 108, application partition 102a may house a non-partitioned GOS (i.e., whereby the application partition 102a is not further partitioned into one or more virtual machines) including a health monitor 158 and applications 160a, 160b executing on the application partition 102a. The application partition 102a may additionally include a network proxy 148 for forwarding network operations requests to the network offload engine 102 (or to the AFDX offload engine on application core 108) via the CIPC 146.

Figure 2:
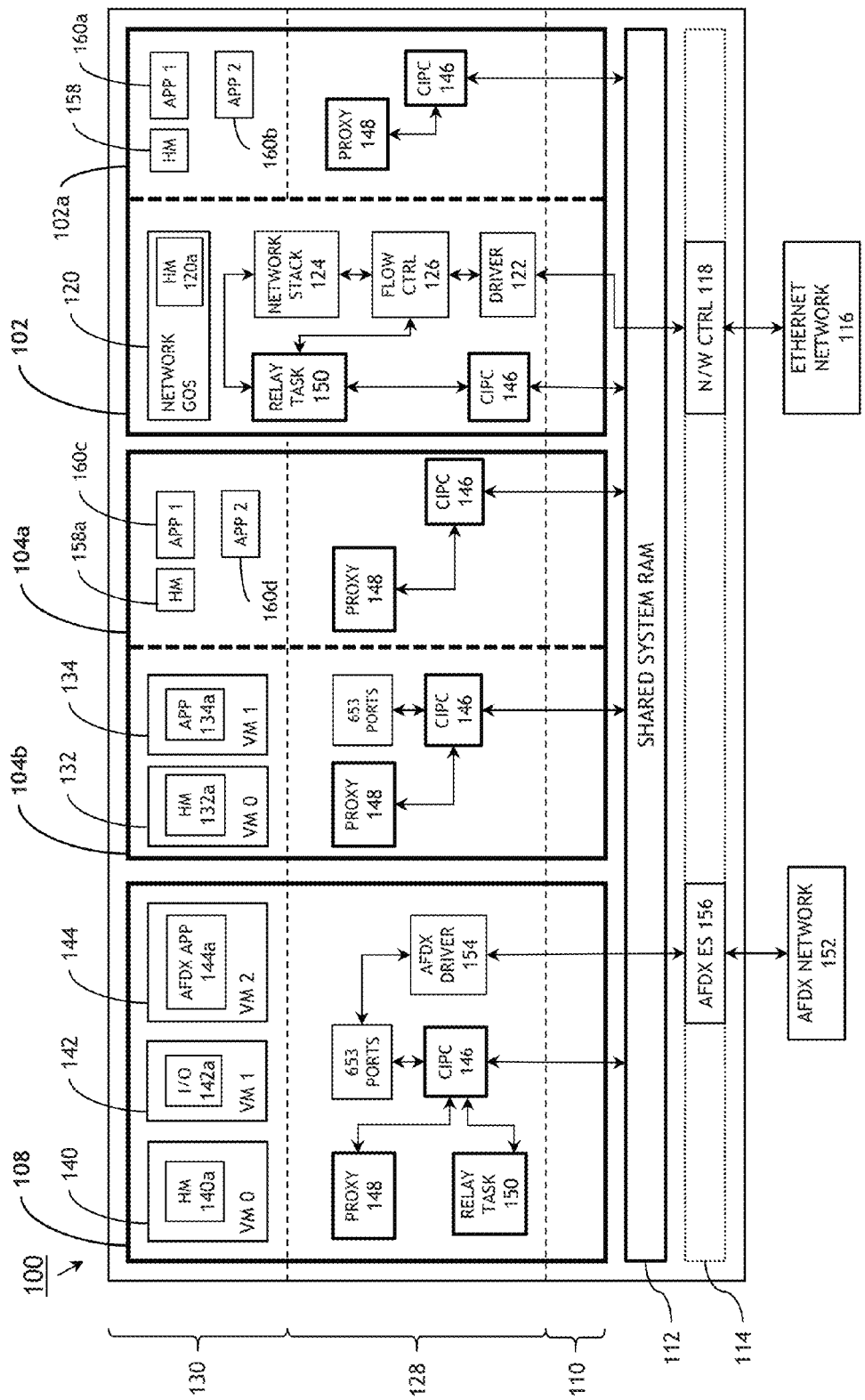
FIG. 2 is a block diagram depicting a processor system according to embodiments of the inventive concepts disclosed herein.

Referring to FIG. 2, an application core 104 of the partitioned processor system 100 can be partitioned into two sub-partitions, one sub-partition (104a) housing a non-partitioned GOS and the other sub-partition (104b) housing a partitioned GOS 104b. For example, the non-partitioned GOS on sub-partition 104a may not include a virtual machine, but may include a health monitor 158a and applications 160c, 160d executing thereon. Similarly, the sub-partition 104b may include a GOS health monitor 132a running on the default virtual machine 132 (at VM 0) and one or more applications 134a running on the virtual machine 134 (at VM 1). Both sub-partitions 104a, 104b may include a network proxy 148 for communicating network operations requests to the network offload engine 102 via the CIPC 146.

Figure 3A:
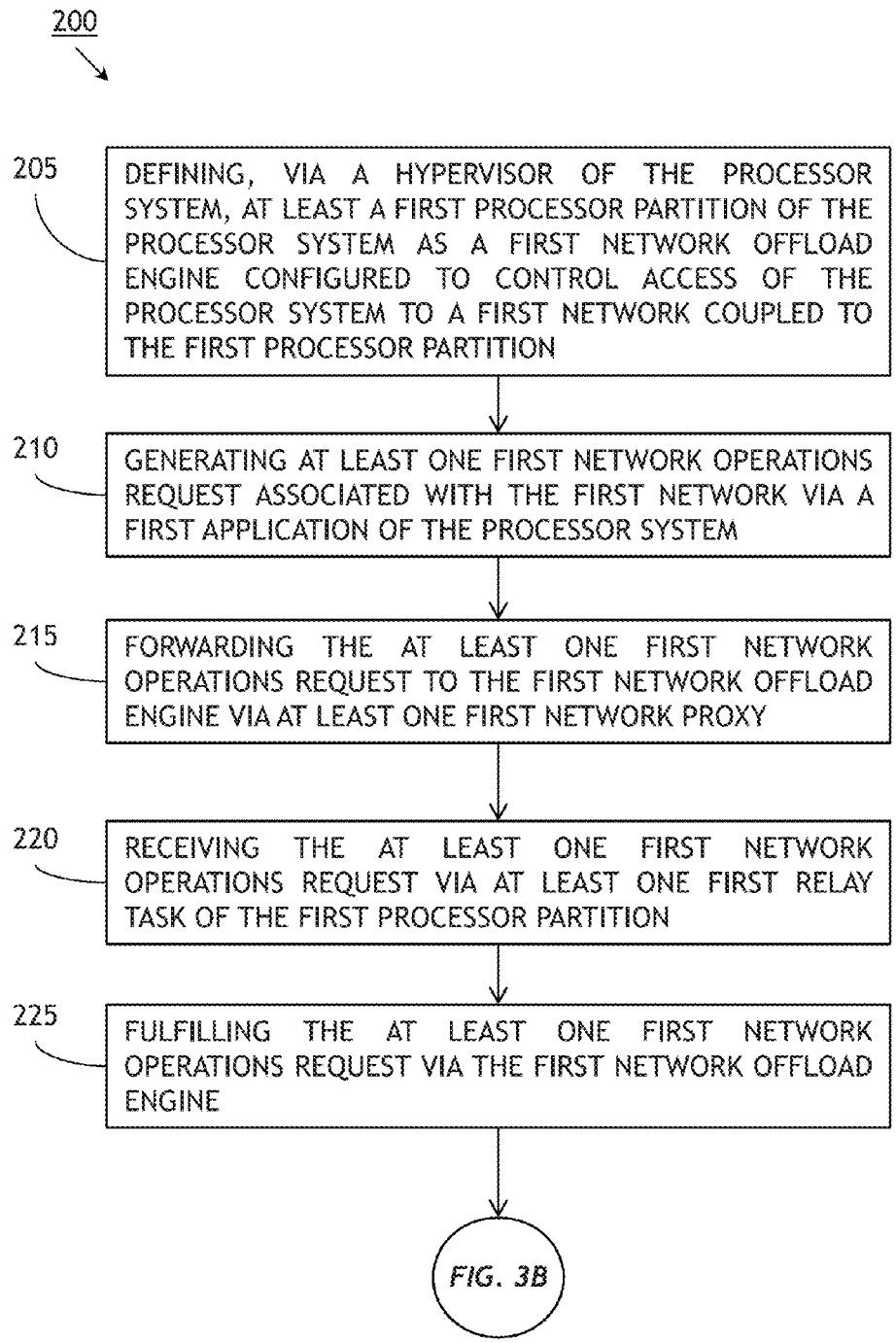
FIGS. 3A and 3B are process flow diagrams for a method of operating a processor system according to embodiments of the inventive concepts disclosed herein.
Figure 3B:
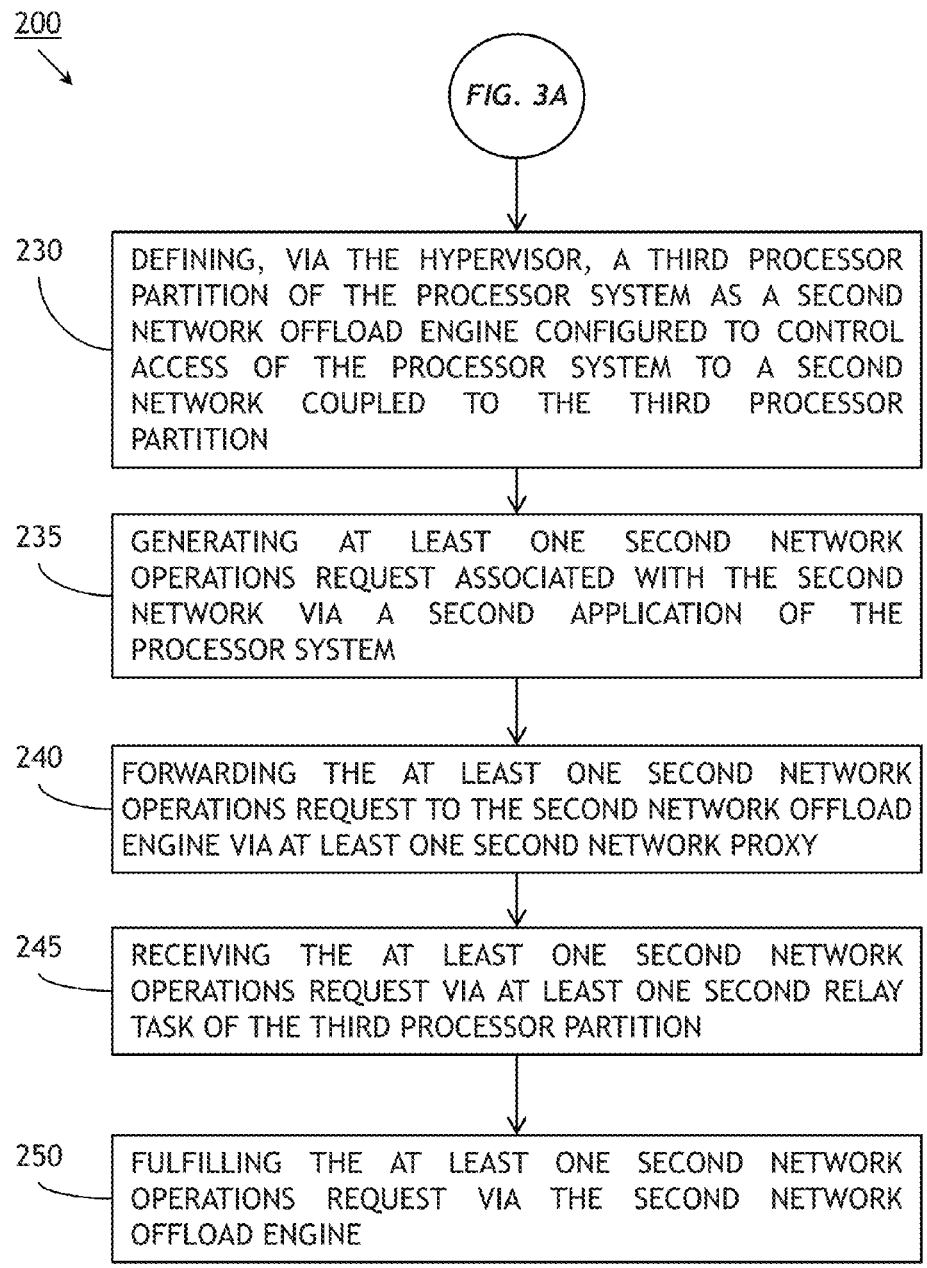

FIGS. 3A and 3B illustrate a method 200 for operating a partitioned processor system 100 according to embodiments of the inventive concepts disclosed herein. At step 205, a hypervisor 110 of the processor system 100 defines at least a first processor partition of the processor system 100 as a first network offload engine 102 configured to control access of the processor system 100 to a first network 116 coupled to the first processor partition. For example, the hypervisor 110 may define at least a first partition of the processor system 100 as a network offload engine 102 configured to control access of the processor system 100 to a first network 116 coupled to the first partition, the first network 116 associated with a first network protocol.

At step 210, a first application 134a running on the processor system 100 generates at least one first network operations request associated with the first network 116. For example, a first application 134a of a second processor partition 104 of the processor system 100 may generate at least one first network operations request associated with the first network 116.

At step 215, a first network proxy 148 forwards the at least one first network operations request to the first network offload engine 102. For example, the first network proxy 148 of the second partition 104 may forward the at least one first network operations request to the first network offload engine 102.

At step 220, the first relay task 150 of the first processor partition receives the at least one first network operations request.

At step 225, the first network offload engine 102 fulfills the at least one first network operations request. For example, the flow control component 126 of the first network offload engine 102 may grant or deny the at least one first network operations request.

Referring to FIG. 3B, the method 200 may include additional steps 230, 235, 240, 245 and 250. At step 230, the method 200 defines a third partition 108 of the processor system 100 as a second network offload engine configured to control access of the processor system 100 to a second network 152 coupled to the third partition 108. For example, the hypervisor 110 may further define a third processor partition 108 of the processor system 100 as a second network offload engine configured to control access of the processor system 100 to a second network 152 coupled to the third processor partition 108, the second network 152 associated with a second network protocol.

At step 235, a second application 138a of the processor system 100 generates at least one second network operations request associated with the second network 152. For example, a second application 138a of a fourth partition 106 of the processor system 100 may generate at least one second network operations request associated with the second network 152, wherein the fourth partition 106 includes any partition of the processor system 100 other than the third partition 108.

At step 240, a second network proxy 148 forwards the at least one second network operations request to the second network offload engine. For example, the second network proxy 148 of the fourth partition 106 may forward the at least one second network operations request to the second network offload engine.

At step 245, the second relay task 150 of the third partition 108 receives the at least one second network operations request.

At step 250, the second network offload engine fulfills the at least one second network operations request. For example, the second network offload engine may grant or deny the at least one second network operations request.

While particular aspects of the subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

We claim:

1. A multi-core avionics processing resource (MCPR) comprising:
   a plurality of avionics processing cores coupled to at least one shared system memory, the plurality of avionics processing cores including:
   a single network core coupled to a first network protocol via a first network controller, the first network protocol including an Ethernet network, the single network core comprising:
   one or more partitions having at least one operating system configured to execute at least one first Ethernet operations request on the single network core, the at least one first Ethernet operations request associated with one or more of a first criticality level and a first priority level;
   a single Ethernet network stack associated with the Ethernet network and configured to execute one or more of the at least one first Ethernet operations request and at least one second Ethernet operations request on the single network core; and
   at least one flow control component configured to control access of the at least one first Ethernet operations request and the at least one second Ethernet operations request to resources of the single network core; and
   at least one application core coupled to a second network protocol via a second network controller, the at least one application core comprising:
   at least one application configured to generate the at least one second Ethernet operations request for execution on the single network core, the at least one application associated with one or more of a second criticality level and a second priority level;
   the at least one flow control component further configured for one or more of granting, denying, and truncating one or more of the at least one first Ethernet operations request and the at least one second Ethernet operations request based on one or more of the first criticality level, the first priority level, the second criticality level, and the second priority level;
   the at least one application core isolated from asynchronous Ethernet network traffic received by the single network core via the first network controller;
   the single network core isolated from second network protocol traffic received by the at least one application core via the second network controller; and
   at least one communications interface comprising:
   at least one network proxy associated with the at least one application core and configured to forward the at least one second Ethernet operations request to the at least one flow control component to fulfill one or more of the at least one first Ethernet operations request and the at least one second Ethernet operations request via the single Ethernet network stack and the shared system memory.

2. The MCPR of claim 1, wherein the at least one application core comprises a first processor partition, the single network core comprises at least one second processor partition, and a portion of the at least one first processor partition includes a third processor partition, the third processor partition including one or more of:
   at least one second application and at least one second operating system, the third processor partition being associated with at least one second network proxy.

3. The MCPR of claim 1, wherein the plurality of avionics processing cores include at least one multithreaded processing core and:
   the single network core corresponds to at least one first thread of the multithreaded processing core; and
   the at least one application core corresponds to at least one second thread of the multithreaded processing core.

4. The MCPR of claim 1, wherein the Ethernet network is associated with a protocol including one or more of TCP/IP and UDP/IP.

5. The MCPR of claim 1, wherein the Ethernet network is a first Ethernet network, the at least one application is at least one first application, the at least one application core is at least one first application core, the at least one flow control component is at least one first flow control component, and the at least one communications interface is at least one first communications interface, further comprising:
   at least one second flow control component associated with a second Ethernet network connected to the MCPR, the at least one second flow control component configured to control access of one or more of the at least one first Ethernet operations request, the at least one second Ethernet operations request, and at least one third Ethernet operations request to a second Ethernet network of at least one second application core of the MCPR, the at least one third Ethernet operations request generated from one or more of the at least one first application, at least one second application, and the operating system, the at least one second application associated with one or more of a third criticality level and a third priority level; and
   at least one second communications interface, comprising:
   at least one second network proxy associated with one or more of the single network core, the at least one first application core, and the at least one second application core and configured to forward one or more of the at least one first Ethernet operations request, the at least one second Ethernet operations request, and the at least one third Ethernet operations request associated with the second Ethernet network from one or more of the operating system, the at least one first application, and the at least one second application; and
   the at least one second flow control component further configured for one or more of granting, denying, and truncating one or more of the at least one first Ethernet operations request, the at least one second Ethernet operations request, and the at least one third Ethernet operations request based on one or more of the first criticality level, the first priority level, the second criticality level, the second priority level, the third criticality level, and the third priority level.

6. The MCPR of claim 5, wherein the first Ethernet network is associated with one or more of TCP/IP and UDP/IP and the second network protocol including one or more of Avionics Full Duplex Switched Ethernet (AFDX), ARINC 429, and MIL-STD-1553.

7. The MCPR of claim 1, wherein the MCPR is an ARINC 653 compliant MCPR embodied in an aircraft system.

8. A method for operating a multi-core avionics processing resource, comprising:
   assigning, via a multi-core processing resource (MCPR) of an avionics processing system, one or more of a first criticality and a first priority to at least one first Ethernet operations request for execution via an operating system of a single network core, the single network core coupled to a first network protocol via a first network controller, the first network protocol including an Ethernet network of the MCPR;

assigning, via the MCPR, one or more of a second criticality and a second priority to at least one application configured to generate at least one second Ethernet operations request for execution on the single network core of the MCPR, the at least one application associated with an application core coupled to a second network protocol via a second network controller of the MCPR, the application core isolated from asynchronous Ethernet network traffic received by the single network core via the first network controller, the single network core isolated from second network protocol traffic received by the application core via the second network controller;

forwarding the at least one second Ethernet operations request to the single network core via at least one network proxy associated with the application core; and fulfilling one or more of the at least one first Ethernet operations request and the at least one second Ethernet operations request via one or more of a flow controller associated with the single network core, a single Ethernet network stack, a shared system memory, and at least one communications interface, the fulfilling being based on one or more of the first criticality, the first priority, the second criticality, and the second priority.

9. The method of claim 8, wherein fulfilling one or more of the at least one first Ethernet operations request and the at least one second Ethernet operations request via a flow controller associated with the single network core, a single Ethernet network stack, a shared system memory, and at least one communications interface, the fulfilling being based on one or more of the first criticality, the first priority, the second criticality, and the second priority includes:

receiving, via a relay task associated with the single network core, one or more of the at least one first Ethernet operations request and the at least one second Ethernet operations request; and granting one or more of the at least one first Ethernet operations request and the at least one second Ethernet operations request based on one or more of the first criticality, the first priority, the second criticality, and the second priority.

10. The method of claim 8, wherein the application core is a first application core, the at least one application is at least one first application, the operating system is a first operating system, the at least one network proxy is at least one first network proxy, the flow controller is a first flow controller, the at least one communications interface is at least one first communications interface, and the Ethernet network is a first Ethernet network, the method further comprising:

generating at least one third Ethernet operations request associated with a second Ethernet network connected to the MCPR via one or more of a second operating system and at least one second application, the second operating system and the at least one second application being associated with at least one second application core, the at least one third Ethernet operations request being assigned one or more of a third criticality and a third priority;

forwarding the at least one third Ethernet operations request to the single network core or a third application core of the MCPR via at least one second network proxy, the at least one second network proxy associated with the at least one second application core and communicatively coupled to the single network core or the third application core; and fulfilling the at least one third network operations request via one or more of the first flow controller or the second flow controller, the single Ethernet network stack or a driver associated with the third application core, and the shared system memory, the fulfilling being based on one or more of the first criticality, the first priority, the second criticality, the second priority, the third criticality, and the third priority.

11. The method of claim 10, wherein fulfilling the at least one third Ethernet operations request via one or more of the first flow controller or the second flow controller, the single Ethernet network stack or a driver associated with the third application core, and the shared system memory, the fulfilling being based on one or more of the first criticality, the first priority, the second criticality, the second priority, the third criticality, and the third priority includes:

operably receiving the at least one third Ethernet operations request via 1) one or more of at least one first relay task of the single network core and at least one second relay task of the third application core, and 2) one or more of the first flow controller of the single network core and a second flow controller of the third application core; and one or more of granting the at least one third Ethernet operations request, denying the at least one third Ethernet operations request, and truncating the at least one third Ethernet operations request.

12. The method of claim 8, wherein fulfilling one or more of the at least one first Ethernet operations request and the at least one second Ethernet operations request via one or more of a flow controller associated with the single network core, a single Ethernet network stack, a shared system memory, and at least one communications interface, the fulfilling being based on one or more of the first criticality, the first priority, the second criticality, and the second priority includes:

denying one or more of the at least one first Ethernet operations request and the at least one second Ethernet operations request based on one or more of the first criticality, the first priority, the second criticality, and the second priority.

13. The method of claim 8, wherein fulfilling one or more of the at least one first Ethernet operations request and the at least one second Ethernet operations request via a flow controller associated with the single network core, a single Ethernet network stack, a shared system memory, and at least one communications interface, the fulfilling being based on one or more of the first criticality, the first priority, the second criticality, and the second priority includes:

operably receiving at least one third Ethernet operations request via 1) one or more of at least one first relay task of the single network core and at least one second relay task of a third application core, and 2) one or more of the first flow controller of the single network core and a second flow controller of the third application core;

truncating one or more of the at least one first Ethernet operations request and the at least one second Ethernet operations request based on one or more of the first criticality, the first priority, the second criticality, and the second priority; and fulfilling the at least one third Ethernet operations request associated with one or more of a third criticality and a third priority, when either:
  the third criticality is higher than the first criticality or the second criticality; or
  the third priority is higher than the first priority or the second priority.

14. The MCPR of claim 1, wherein the second criticality level is more critical than the first criticality level and the second priority level is of a higher priority than the first priority level.

15. The MCPR of claim 2, wherein the at least one second operating system is associated with at least one third network proxy.

16. The MCPR of claim 1, wherein the at least one application is at least one first application, the single network core comprises a first processor partition of the one or more partitions, the at least one application core comprises at least one second processor partition, and a portion of the first processor partition includes a third processor partition of the one or more partitions, the third processor partition including:
  one or more of at least one second application and a health monitor, wherein the third processor partition is associated with at least one second network proxy.

17. The MCPR of claim 2, wherein the at least one second Ethernet operations request is fed from the at least one application core to the at least one flow control component via the at least one relay task to bypass the single Ethernet network stack.

18. The MCPR of claim 1, further comprising:
  a hypervisor, wherein the at least one application core comprises one or more virtual machines and the hypervisor is configured for one or more of generating and monitoring the one or more virtual machines.

19. The MCPR of claim 1,
  the first network controller being configured for single core or single partition communication, the second network controller being configured for single core or single partition communication.

20. The method of claim 8, wherein the Ethernet network is a first Ethernet network, the single network core is a first single network core, the method further comprising:
  defining, via a hypervisor, a first processing core or partition of the MCPR as the single network core configured as an offload engine for controlling access to the first Ethernet network associated with the first single network core; and
  defining, via the hypervisor, a second processing core or partition of the MCPR as the second single network core configured for controlling access to the second Ethernet network associated with the second single network core.

* * * * *